United States Patent [19]

Forsyth et al.

[11] B 3,989,826

[45] Nov. 2, 1976

[54] METHOD OF KILLING INTERNAL PARASITES USING SALICYLANILIDES

[75] Inventors: Bruce Adam Forsyth, Croydon; David Ernest Pryor, Balwyn, both of Australia

[73] Assignee: ICI Australia Limited, Melbourne, Australia

[22] Filed: July 10, 1974

[21] Appl. No.: 487,133

[44] Published under the second Trial Voluntary Protest Program on January 27, 1976 as document No. B 487,133.

Related U.S. Application Data

[62] Division of Ser. No. 355,813, April 30, 1973, Pat. No. 3,927,071.

[30] Foreign Application Priority Data

May 12, 1972 Australia.............................. 8942/72
Aug. 3, 1972 Australia.............................. 9940/72
Dec. 5, 1972 Australia.............................. 1505/72

[52] U.S. Cl.............................. 424/230; 260/559 S
[51] Int. Cl.[2]........................................ A61K 31/60
[58] Field of Search........................... 424/230, 324

[56] References Cited
UNITED STATES PATENTS 3,801,637   4/1974   Meek.................................. 424/324
3,823,236   7/1974   Buchel et al........................ 424/230

Primary Examiner—V. D. Turner
Attorney, Agent, or Firm—Cushman, Darby & Cushman

[57] ABSTRACT

A method of killing internal parasites in warm blooded animals comprising administering orally or parenterally to an infected animal an effective amount of a compound of the formula:

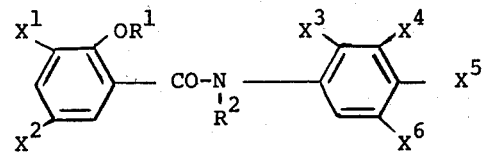

where $R^1$ is hydrogen or acetyl, $R^2$ is hydrogen, acetyl or lower alkyl, $X^1$ and $X^2$ are iodine atoms; $X^3$, $X^4$, $X^5$ and $X^6$ which may be the same or different are chlorine, bromine, iodine, trifluoromethyl or hydrogen; at least two and not more than two of $X^3$, $X^4$, $X^5$ and $X^6$ are hydrogen; when $X^3$ is chlorine, bromine, iodine or trifluoromethyl, then $X^4$ and $X^6$ are both hydrogen; and at least one of $X^3$, $X^4$, $X^5$ and $X^6$ is trifluoromethyl, said compound being administered in a dosage amount of from 1 to 50 mg active ingredient/Kg animal bodyweight.

7 Claims, No Drawings

METHOD OF KILLING INTERNAL PARASITES USING SALICYLANILIDES

This is a division, of copending application Ser. No. 355,813 filed Apr. 30, 1973.

This invention relates to compositions for killing internal parasites of warm blooded animals; in particular it relates to compositions for killing trematodes or nematodes. An example of a trematode is the liver fluke (*Fasciola hepatica*) which is a parasite of bile ducts of the liver of ruminants, such as cattle, sheep and goats. The liver fluke each year causes a significant amount of economic loss, not only from the death of the host animal but also from the deterioration in the value of meat and wool produced by infected animals. In cattle a loss in milk yield from liver fluke infection will also occur and in addition the loss sustained by the condemnation of infected livers as human food may also be considerable.

An example of a nematode is *Haemonchus contortus* which is a nematode parasitic in the abomasum or fourth stomach of ruminants. It is a blood sucking parasite and when present in large numbers can cause anaemia and finally the death of the host. It can cause extensive losses, not only in the value of the animals which it may kill but also in the diminished production of commercial items such as wool and meat. There is therefore a commercial need to treat animals with chemicals which are both safe and effective in reducing the incidence and severity of diseases caused by both trematodes and nematodes.

It has previously been proposed to use certain salicylanilides as flukicides. Thus Australian Patent Application No. 34997/63 discloses the use of 3,5,4'-trihalosalicylanilides and Australian Pat. No. 277925 discloses the use of 3,5,3',4'-tetrachlorosalicylanilide. We have now found a class of salicylanilides which possesses a hitherto undiscovered, an unexpectedly high, flukicidal activity. The compounds of our invention are markedly superior to both the trihalo compounds of Australian Pat. Application No. 34997/63 and the tetrachloro compound of Australian Pat. No. 277925. Certain of our compounds also possess high activity against nematodes such as *Haemonchus contortus*.

Accordingly we provide a compound of general formula I.

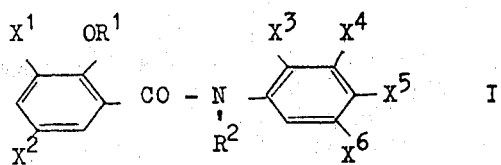

wherein $R^1$ is hydrogen or lower acyl, $R^2$ is hydrogen, lower acyl or lower alkyl, $X^1$ and $X^2$ which may be the same or different are bromine or iodine atoms; $X^3$, $X^4$, $X^5$ and $X^6$ which may be the same or different are chlorine, bromine, iodine, trifluoromethyl or hydrogen; at least two and not more than two of $X^3$, $X^4$, $X^5$ and $X^6$ are hydrogen; when $X^3$ is chlorine, bromine, iodine or trifluoromethyl, then $X^4$ and $X^6$ are both hydrogen; and at least one of $X^3$, $X^4$, $X^5$ and $X^6$ is trifluoromethyl. By lower acyl we mean an acyl group containing 1 to 6 carbon atoms, preferably the acyl group is acetyl. Preferably $X^1$ is the same as $X^2$.

We also provide compositions for eradicating certain internal parasites in warm blooded animals comprising as active ingredient a compound of general formula I.

We have found that 3,5-diiodo-3',5'-di(trifluoromethyl) salicylanilide and its acetyl derivatives are of particular interest in the eradication of liver fluke.

The active ingredients of our parasiticidal compositions may be prepared by the reaction of a suitably substituted salicylic acid or salicylic acid derivative with a suitably substituted aniline.

Accordingly we also provide a process for the manufacture of the compounds of general formula I which process comprises reacting a compound of general formula II:

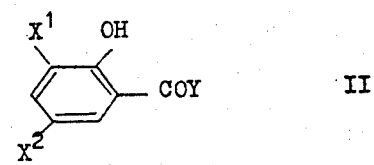

with an aniline of general formula III:

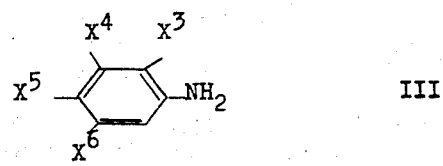

wherein $X^1$, $X^2$, $X^3$, $X^4$, $X^5$ and $X^6$ are as defined hereinabove, and Y is a hydroxy group or a chlorine or bromine atom.

The acylated compounds are prepared by the acylation of the reaction product from this process for example by treatment with an acid chloride.

The compositions of the present invention have utility in the field of animal therapy. They are effective anthelmintics and are especially effective against both mature and immature liver fluke of the Fasciola genus. Many of the compositions of the invention also possess activity against nematodes such as *Haemonchus contortus*.

The high activity against immature liver fluke and *Haemonchus contortus* is surprising as in general, flukicides are markedly less active against immature liver fluke than adult fluke and in addition often have no effect on nematodes such as *Haemonchus contortus*.

We also provide a method of treating warm blooded animals to eradicate certain internal parasites; such method comprises administering to said warm blooded animals a therapeutic dose of a composition comprising as active ingredient a compound of formula I as defined hereinbefore.

For effective treatment, certain dosage levels are desired depending upon the compound employed, the type of animal to be treated, and the particular helminth being combatted. In general, effective fluke efficacy is achieved when the composition is administered in a single dose at dosage levels of from about 1 to 50 mg. active ingredient/kg. of animal body weight, and preferably from about 3 to 20 mg. active ingredient per kg. of animal body weight.

The compositions of the present invention may be administered in a variety of ways, depending upon the particular animal employed, the type of anthelmintic treatment normally given to such an animal, the materials employed, and the particular helminths being combatted. It is preferred to administer them in a single efficacious oral or parenteral dose at a time when fluke or nematode infection is apparent or suspected. They may be employed alone or in combination with other anthelmintics, parasiticides or antibacterials.

The amounts of the active anthelmintic ingredient in the composition, as well as the remaining constituents are varied according to the type of treatment to be employed, the host animal, and the particular parasitic disease being treated. In general, however, compositions containing a total weight percent of the active compound or compounds ranging from 0.001 to 95% will be suitable with the remainder being any suitable carrier or vehicle. Furthermore, the compositions should contain enough of the active ingredient to provide an effective dosage for the proper treatment of the parasitic disease.

A number of modes of treatment may be employed, and each to some extent determines the general nature of the composition. For example, the anthelmintic compositions may be administered to domesticated animals in single unit oral dosage form such as a tablet, bolus, capsule or drench; in a liquid form suitable for parenteral administration; or they may be compounded as a feed premix to be later admixed with the animal's food.

When the compositions are to be solid unit dosage forms as in tablets, capsules, or boluses, the ingredients other than the active ingredient may be any other pharmaceutically acceptable vehicles covenient in the preparation of such forms, and preferably materials nutritionally suitable such as starch, lactose, talc, magnesium stearate, vegetable gums, and the like. Moreover when capsules are employed, the active compound may be used in essentially undiluted form, the only extraneous material being that of the capsule casing itself which may be hard or soft gelatin or any other pharmaceutically acceptable encapsulating material. When the dosage form is to be used for parenteral administration, the active material is suitably admixed with an acceptable base vehicle. In all of such forms, i.e. in tablets, boluses, capsules, and injectable formulations, the active compound conveniently ranges from about 5 to 80% by weight of the total composition.

When the unit dosage form is to be in the form of a drench, the active ingredient may be mixed with agents which will aid in the subsequent suspending of the active compound in water, such as bentonite, clays, water-soluble starches, cellulose derivatives, gums, surface active agents and the like to form a dry predrench composition, and this predrench composition added to water just before use. In the predrench formulation, in addition to the suspending agent, such ingredients as preservatives, antifoam compounds, and the like may be employed. Such a dry product may contain as much as 95% by weight of the active compound, the rest being contributed by the excipients. Preferably, the solid composition contains from 30 to 95% by weight of the active compound. Enough water should be added to the solid product to provide the proper dosage level within a convenient amount of liquid for a single oral dose. Liquid drench formulations containing from about 10 to 50 weight percent of dry ingredients will in general be suitable with the preferred range being from 15 to 30 weight percent.

Where the compositions are intended to be used as feeds, feed supplements, or feed premixes, they will be mixed with suitable ingredients of an animal's nutrient ration. The solid orally-ingestible carriers normally used for such purposes, such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like are all suitable. The active compounds are intimately dispersed or admixed throughout the solid inert carrier by methods such as grinding, stirring, milling or tumbling. By selecting proper diluents and by altering the ratio of carrier to active ingredient, compositions of any desired concentration may be prepared. Feed supplement formulations containing from about 10 to 30% by weight of active ingredient are particularly suitable for addition to feeds. The active compound is normally dispersed or mixed uniformly in the diluent but in some instances may be adsorbed on the carrier.

These supplements are added to the finished animal feed in an amount adequate to give the final concentration of active ingredient desired for controlling or treating the helminth infection by way of the animal ration. Although the preferred level in feeds will depend on the particular compounds being employed, the active ingredients of this invention are normally fed at levels of 0.05 – 25% in the feed. As stated above, animals are preferably treated at a time when the infestation is apparent or suspected and the most preferred method for such treatment is via the single oral dose technique. Thus administration of medicated feed is not preferred but may certainly be employed. Similarly, the amounts of drug present in the feed may be reduced to levels in the order of 0.001% to 3.0 weight percent based on the weight of feed, and the medicated feed administered over prolonged periods. This would be in the nature of a preventive or prophylactic measure but again is not the mode of choice. Another method of administering the compositions of this invention to animals whose feeds are conveniently pelleted, such as sheep, is to incorporate them directly in the pellets. For instance, the compositions are readily incorporated in nutritionally adequate alfalfa pellets at levels of 2 to 110 grams per pound of pellets for therapeutic use, and at lower levels for example 80 to 1000 milligrams per pound for prophylactic use, and such pellets fed to the animals.

The compositions may also optionally contain other drugs of veterinary utility. Veterinary drugs which may be present in the vertinary compositions of this invention, depending upon the mode of administration of the said compositions, include for example, piperazine, 1-diethylcarbamyl-4-methyl-piperazine, tetrachloroethylene, organic and inorganic arsenical compounds, tetramisole, 2-phenylbenzimidazole, thiabendazole, phenothiazine, mebendazole and pyrantel salts.

Certain of the compositions of our invention are of use as textile treatment agents and as additives to detergents, soap and cutting oils, paints, hard surface cleaners, to prevent deterioration on storage caused by microbiological agents.

The invention is now illustrated by, but by no means limited to, the following examples in which all parts are part by weight unless otherwise specified.

EXAMPLE 1

3,5-diiodo-3',5'-di(trifluoromethyl)-salicylanilide was synthesised by adding 1 mole of 3,5-diiodosalicyl chloride in ethylene dichloride to a stirred solution of 2 moles of 3,5-di(trifluoromethyl) aniline in ethylene dichloride. The reaction mixture was stirred for several hours at room temperature and the filtered crystals were washed with hot water and recrystallised from acetic acid to give needle-like crystals melting at 212°C. The structure was verified by infra-red spectroscopy and mass-spectroscopy.

w/w solution of 'Lubrol E' ('Lubrol E' is a Trade Mark for an octylphenol ethoxylate). The mixture was ball-milled for 30 minutes and the resultant suspension was used as an aqueous drench.

EXAMPLE 4

Compositions prepared by the method of Example 7 were used as a single dose drench for use to treat sheep infected with sheep liver fluke (*Fasciola hepatica*). The number of liver fluke eggs in the faeces was measured at the time of treatment and 4; 7; 8 and 10 days after treatment. After treatment, the sheep were killed and the number of adult flukes in the liver counted. The amount and structure of active ingredient in each composition and the results of treatment of a sheep with that composition are given in the Table I below.

TABLE I

| ACTIVE INGREDIENT | | FAECAL EGG COUNT (EGGS PER G. OF FAECES) ON DAY | | | | | POST MORTEM RESULTS | |
|---|---|---|---|---|---|---|---|---|
| Structure | Dose Rate mg/kg | 0 | 4 | 7 | 10 | 13 | Sheep killed on day | No. of adult fluke |
| [3,5-diiodo-3',5'-di(trifluoromethyl)-salicylanilide] | 5 | 400 | | | | 0 | 13 | 0 |
| [3,5-diiodo-2'-chloro-5'-trifluoromethyl-salicylanilide] | 5 | 210 | | | | 0 | 10 | 0 |
| [3,5-diiodo-2'-trifluoromethyl-4'-bromo-salicylanilide] | 2.5 | 720 | | | | 0 | 10 | 0 |
| | 5 | 190 | | | | 0 | 10 | 0 |

EXAMPLE 2

The process of Example 1 was repeated except that instead of 3,5-diiodosalicyl chloride and 2,4-dibromoaniline the reagents shown below were used in similar proportions to give the product shown. The structure of the products was verified by infra-red spectroscopy and mass-spectroscopy.

| Experiment No. | Starting Materials | | Product Structure | °C m.p. |
|---|---|---|---|---|
| | Salicyl chloride | Aniline | | |
| 1 | 3,5-diiodo | 4-chloro-2-tri-fluoromethyl | 3,5-diiodo-4'-chloro-2'-trifluoro-methyl-salicylanilide | 167 |
| 2 | 3,5-diiodo | 4-bromo-3-tri-fluoromethyl | 3,5-diiodo-4'-bromo-3'-trifluoro methyl-salicylanilide | 182 |

EXAMPLE 3

Compositions suitable for use as experimental aqueous drenches were prepared in the following general manner. A mixture of the required amount of active ingredients was mixed with 40 ml of an aqueous 0.25%

EXAMPLE 5

Compositions prepared by the method of Example 7 were used as a single dose drench for use to treat sheep infected with immature sheep liver fluke (*Fasciola hepatica*).

Infective metacercariae of the liver fluke are obtained from laboratory cultures of the snail intermediate host (*Lymnaea tomentosa*) and counted so that 300 of these metacercariae can be given by mouth to sheep known to be free of the liver fluke. When the resultant developing infection of liver fluke reaches a prescribed age (usually six weeks) sheep are then treated with the said composition at various dose rates. The infection is then allowed to develop to maturity and when the liver fluke are 12 to 14 weeks of age the sheep are killed and all liver fluke remaining in the liver are removed and counted. The numbers of liver fluke in the treated animals are then compared with those in similar untreated (control) animals and the efficiency of the treatment is then calculated.

The amount and structure of active ingredient in each compound and the results obtained at post mortem and time of post mortem after dose of treatment of a sheep with that composition are given in Table II below.

number of infected control sheep were killed and the worms in their stomach recovered by washing and sieving from the stomach contents. The treatments were assessed by comparing the worm numbers in the treated animals with those in the control animals.

The amount and structure of active ingredient in each composition and the results of treatment of a sheep with that composition are given in Table III below:

The experiment was repeated using sheep infected with Haemonchus 28 days previously.

TABLE III

| ACTIVE INGREDIENT | | Dose Rate mg/kg | % Efficiency mature Haemonchus | % Efficiency 10 day old Haemonchus |
|---|---|---|---|---|
| Structure | | | | |
| (I, OH, CO-NH, CF3, CF3) | | 6 | 98 | |
| (I, OH, CO-NH, CF3, Br) | | 4 | 80 | |
| (I, OH, CO-NH, CF3, Cl) | | 8 | | 98 |

TABLE II

| ACTIVE INGREDIENT | | % EFFICIENCY AGAINST IMMATURE | | | | |
|---|---|---|---|---|---|---|
| Structure | | Dose Rate mg/kg | 4 weeks | 6 weeks | 8 weeks | 10 weeks |
| (I, OH, CO-NH, CF3, Cl) | | 8 | | 91.2 | | |

EXAMPLE 6

Compositions prepared by the method of Example 7 were used as a single dose drench for use to treat sheep infested with haemonchus which had been infected 10 days previously with 3000 infective larvae of *Haemonchus contortus*. These infective larvae had been obtained by culturing the faeces of an infected donor sheep for one week at a temperature of 78°F.

When the infection of *Haemonchus contortus* was 28 days old and mature, all treated sheep together with a

We claim:
1. A method of killing internal parasites in warm blooded animals comprising administering orally or parenterally to an infected animal an effective amount of a compound of the formula:

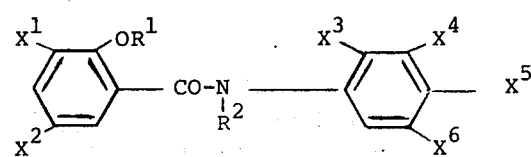

where $R^1$ is hydrogen or acetyl, $R^2$ is hydrogen, acetyl or lower alkyl, $X^1$ and $X^2$ are iodine atoms; $X^3$, $X^4$, $X^5$ and $X^6$ which may be the same or different are chlorine, bromine, iodine, trifluoromethyl or hydrogen; at least two and not more than two of $X^3$, $X^4$, $X^5$ and $X^6$ are hydrogen; when $X^3$ is chlorine, bromine, iodine or trifluoromethyl, then $X^4$ and $X^6$ are both hydrogen; and at least one of $X^3$, $X^4$, $X^5$ and $X^6$ is trifluoromethyl, said compound being administered in a dosage amount of from 1 to 50 mg per Kg animal bodyweight.

2. A method according to claim 1 wherein the amount of compound administered is from 3 to 20 mg per Kg animal bodyweight.

3. A method according to claim 1 wherein $R^1$ and $R^2$ are hydrogen.

4. A method according to claim 1 wherein $R^1$ is acetyl and $R^2$ is hydrogen.

5. A method according to claim 1 wherein the compound is a 3,5-diiodo-3',5'-di(trifluoromethyl)-salicylanilide.

6. A method according to claim 1 wherein the compound is 3,5-diiodo-2'-trifluoromethyl-4'-chlorosalicylanilide.

7. A method according to claim 1 wherein the compound is 3,5-diiodo-3'-trifluoromethyl-4'-bromo salicylanilide.

* * * * *